S. M. LAWHUN.
MOVING PICTURE CAMERA.
APPLICATION FILED SEPT. 25, 1918.

1,359,392.

Patented Nov. 16, 1920.
4 SHEETS—SHEET 1.

WITNESSES

INVENTOR
S. M. Lawhun
BY
ATTORNEYS

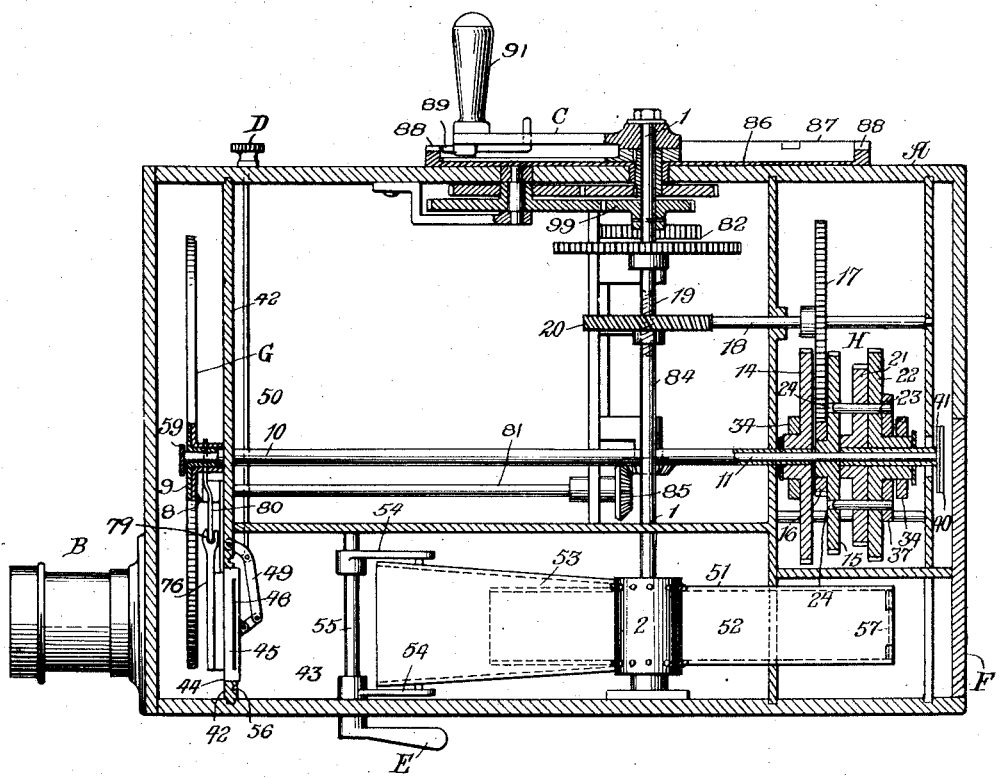

S. M. LAWHUN.
MOVING PICTURE CAMERA.
APPLICATION FILED SEPT. 25, 1918.
1,359,392.
Patented Nov. 16, 1920.
4 SHEETS—SHEET 3.
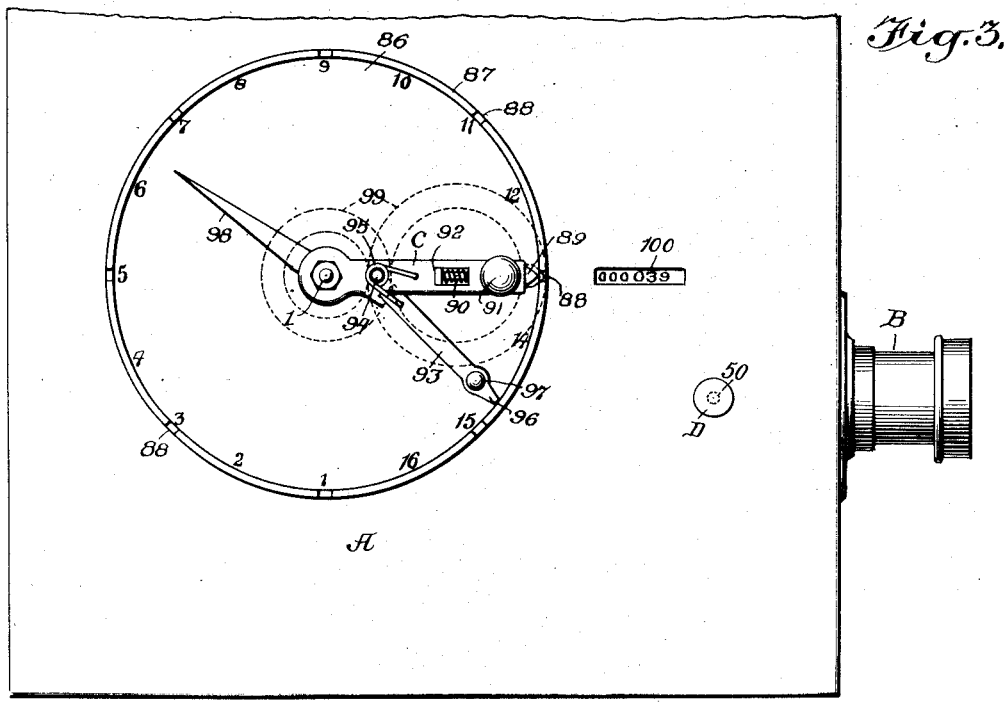
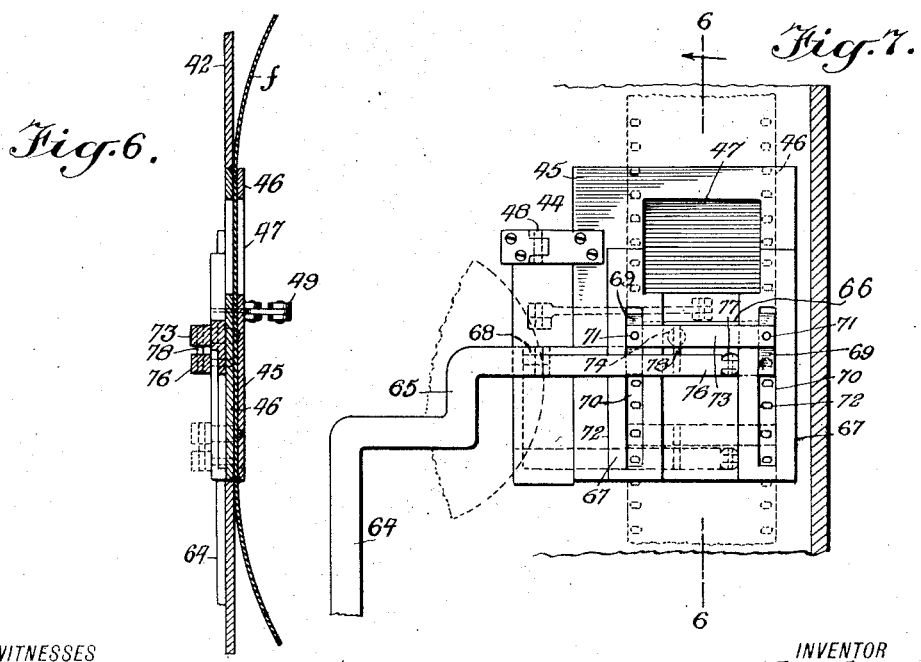
WITNESSES
INVENTOR
S. M. Lawhun
BY
ATTORNEYS

S. M. LAWHUN.
MOVING PICTURE CAMERA.
APPLICATION FILED SEPT. 25, 1918.

1,359,392.

Patented Nov. 16, 1920.
4 SHEETS—SHEET 4.

WITNESSES

INVENTOR
S. M. Lawhun
BY
ATTORNEYS

UNITED STATES PATENT OFFICE.

SAMUEL M. LAWHUN, OF JERSEY CITY, NEW JERSEY, ASSIGNOR, BY MESNE ASSIGNMENTS, TO INVINCIBLE CINEMA CAMERA CORPORATION, A CORPORATION OF NEW YORK.

MOVING-PICTURE CAMERA.

1,359,392.   Specification of Letters Patent.   Patented Nov. 16, 1920.

Original application filed May 23, 1918, Serial No. 236,213. Divided and this application filed September 25, 1918. Serial No. 255,592.

*To all whom it may concern:*

Be it known that I, SAMUEL M. LAWHUN, a citizen of the United States, and a resident of Jersey City, in the county of Hudson and State of New Jersey, have invented a new and Improved Moving-Picture Camera, of which the following is a full, clear, and exact description, this being a division of the application for Letters Patent of the United States for a moving-picture camera, Serial No. 236,213, filed by me on May 23, 1918.

The object of the invention is to provide a new and improved moving picture camera arranged to permit adjustment of the shutter opening to produce dissolving or double exposure effects and for taking pictures under different conditions of light intensity or of different rates of motion of objects. Another object of the invention is to provide a shutter composed of relatively adjustable sections to vary the exposure opening, there being novel moving mechanism between the operating crank and parts of the shutter whereby the operator through the operation of a suitable controller can enlarge or reduce the size of the shutter opening at any time for dissolving or double exposure effect or for adjusting the opening to suit the subject being photographed. Another object of the invention is to provide simple, novel and effective means associated with the operating handle whereby the operator can readily determine the position of the opening of the shutter with respect to the lens for double exposure or trick work, and associated with the operating handle is an indicator which, taken in connection with a meter, will enable the operator to wind back the film to any desired extent for double exposure, and then turn the film forward to restore it to the exact point it occupied before the back winding began.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 2 is a horizontal section taken in the plane of the operating crank shaft and with portions in section at a lower plane;

Fig. 3 is an elevation showing the operating crank side of the camera;

Fig. 6 is a vertical section on the line 6—6 of Fig. 7; and

Fig. 7 is a front view of the film feeder and apertured door.

Figure 1:
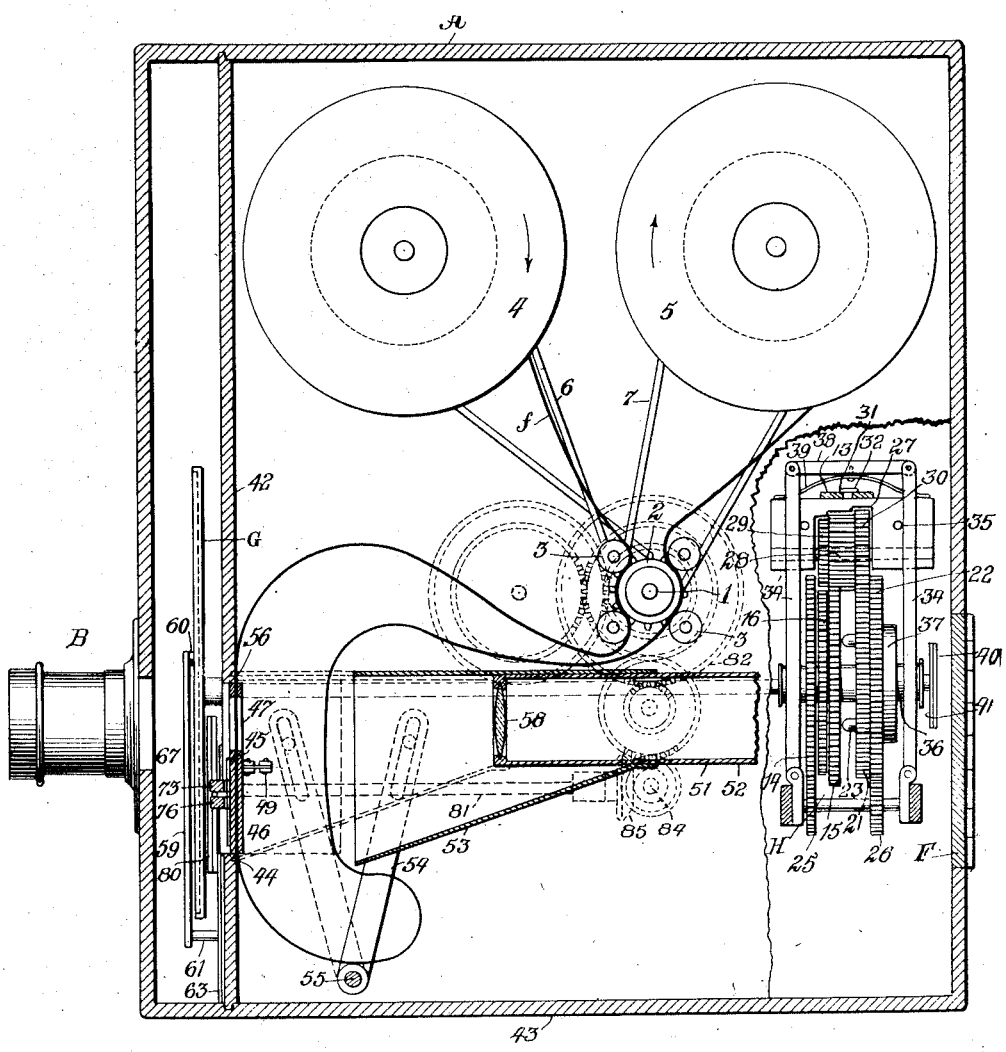
Figure 1 is a vertical section of the moving picture camera taken through the focusing axis and partly broken away to illustrate the gearing for the shutter adjustment.

Referring to the drawing, A designates the box or casing of the camera which is of any suitable construction and has at its front an ordinary focusing lens B which is of the adjustable type, although the adjusting means is not shown, and at one side of the camera is an operating handle C for actuating the film reels, film feeder and shutter, and on the same side of the box A with the operating handle C is a pull knob D for moving the film out of its normal position to permit focusing of the camera, while on the opposite side of the casing is a handle or lever E for adjusting the focusing tube to its operative position after the film has been thrown to one side, and at the rear of the casing is a door F which is adapted to be opened for the purpose of focusing the camera and for determining the set of the shutter opening.

The operating crank C is rigidly fastened to a horizontal shaft 1 which extends across the box A and has a toothed drum 2, along the front and rear of which passes the film f, which is held by idlers 3 in proper relation to the drum and which is carried by the reels 4 and 5 driven by belts 6 and 7, respectively, receiving power from the main shaft 1. Between the loop of the film and the lens is a shutter G which is composed of two sections 8 and 9 secured respectively to a tubular shaft 10 and a solid shaft 11 arranged within the tubular shaft so that by relative rotative adjustment of the two sections the exposure opening 12 of the shutter can be varied to any desired extent and also the dissolving effect can be obtained by the relative movement of the shutter sections.

Figure 5:
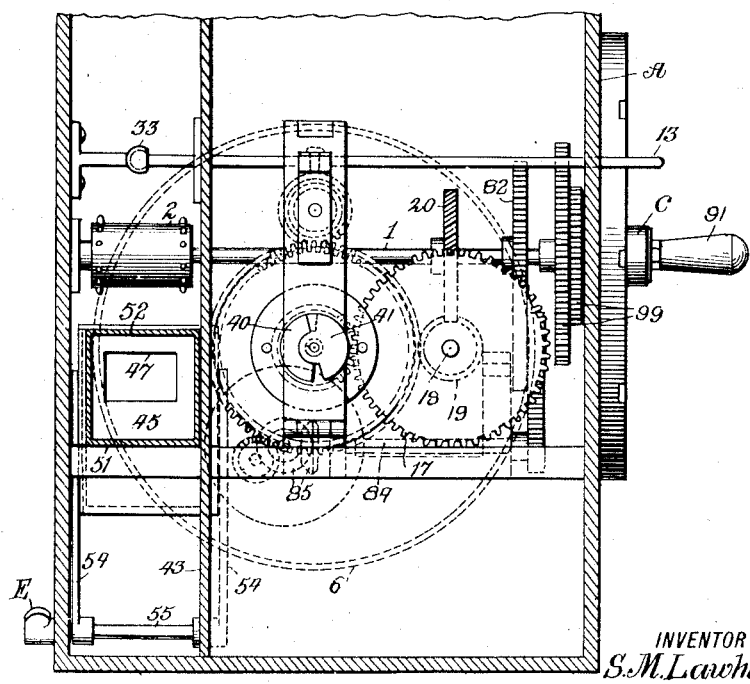
Fig. 5 is a vertical transverse section of the rear portion of the camera.

The adjustment of the shutter sections is brought about through the turning of the operating crank C and by the manipulation of a controlling lever 13 which controls the gearing mechanism H located in the rear of the box. The tubular shaft 10 has a gear wheel 14 fastened thereto and the solid shaft 11 has a gear wheel 15 fastened thereto, which latter has a gear 16 at its hub that permanently meshes with a large gear wheel 17 on a worm shaft 18 which is provided with a skew pinion 19 meshing with a skew gear 20 on the main shaft 1. The solid shaft 11 is thus always driven at a speed fixed with relation to the speed of the main shaft, but the tubular shaft 10 can be varied in speed either above or below the speed of the shaft 11 to increase or decrease the size of the shutter opening. On the shaft 11 are a pair of gear wheels 21 and 22 permanently connected together by clutch pins 23, which latter are adapted to engage in openings 24 in the gear 15. The gears 14 and 22 are permanently connected by connected pinions 25 and 26, so that when the pins 23 are in clutching relation to the gear 15, the two shafts 10—11 are locked together, so that the sections of the shutter rotate in fixed relation to each other, this being the normal operative condition of the parts. When it is desired to change the size of the shutter opening, the clutch pins 23 are unclutched and a sliding gear element 27, Fig. 1, is brought into operation to cause differential rotative speed of the shutter shafts 10 and 11. This shiftable gear element 27 has teeth 28 adapted to engage with the gear 15 in either lateral position of the gear element 27, and also has gear teeth 29 and 30 arranged to engage respectively the gear wheels 14 and 21, according to the direction in which the gear element 27 is shifted. The gear element 27 is carried by a block or equivalent support 31 pivotally connected at 32 with the controlling lever 13, and as the lever has a universal pivot 33, Fig. 5, the outer end of the lever can be moved both up and down and laterally, which movements are necessary to throw the gear element 27 into and out of mesh with the gears 14, 15 and 21. It will be noted that the gears 14 and 21 are of different diameters, so that when either one of these gears is connected with the gear 15 through the shifting gear element 27, the shutter shafts 10 and 11 will rotate at different speeds to cause the shutter sections to increase or decrease the shutter opening. When the shifting element is in the position shown in Fig. 1, the shaft 10 rotates at a higher speed than the shaft 11, and when the gear 29 is meshing with the gear 14 the shaft 10 will rotate at a lower speed than the shaft 11. The lateral motion of the lever 13 operates to throw the clutch pins 23 into and out of clutching position. This is brought about by the lever 34, Fig. 1, which is engaged by a pin 35 on the block 31 and which has a connection at the hub 36 with the disk 37 that carries the clutch pins 23. The lever 34 has a companion lever 34' at the opposite side of the differential shutter gearing H, and the upper ends of the links or levers 34 and 34' are connected by a cross-bar 38, to which is fastened a spring 39 that yieldingly supports the block 31 and holds the same normally in a position for clearing the gear element 27 from the gear wheel 15. To ascertain the set of the shutter sections at any time the rear door F of the box is opened where are exposed two indicating members 40 and 41 which are miniature representations of the shutter sections 8 and 9, and these are normally connected with the shafts 10 and 11.

Figure 4:
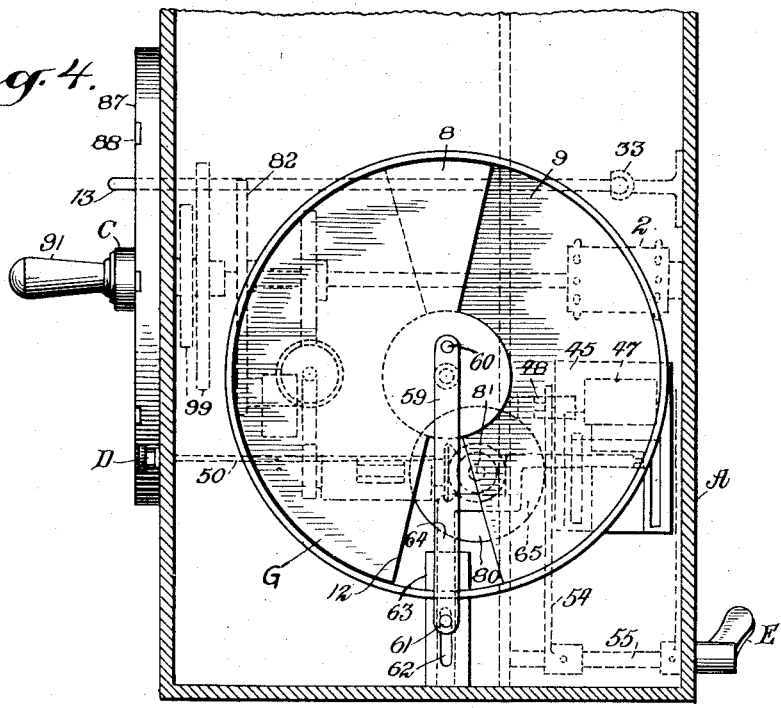
Fig. 4 is a transverse vertical section in front of the shutter.

In the front wall 42 of the film chamber 43, Figs. 4 and 7, is a door opening 44, normally closed by a door 45, which latter has a vertical slot 46 through which the film passes, and in the door is an aperture 47 which is in line with the lens B, so that when the opening of the shutter reaches a point between the lens and film an exposure will be made on the latter. The door is adapted to swing on a hinge 48 through approximately ninety degrees to carry the film out of the way when the camera is to be focused. As shown in Fig. 2, a lever 49 is linked to the door, and a rod 50, to which the pull knob D is attached, is connected with the lever for moving the door open or closed. In the film chamber 43 is a focusing tube 51 composed of a fixed rear section 52 and a movable front section 53 telescopically fitted to the rear section, and the front section is pivotally connected to arms 54 on a rock shaft 55 which has the operating handle E. By turning the handle forwardly or to the left, Fig. 2, the front section 53 of the focusing tube moves from the full to the dotted line position, Fig. 1, there being grooves 56 in the wall 42, so as to receive the front edges of the movable section 53 and exclude light from the film when the latter is drawn aside by the swinging open of the door 45. The rear end of the sighting tube has a door 57, Fig. 2, which is adapted to be thrown open after the door F of the camera box is opened. In the sighting tube section 52 is a magnifying lens 58 for magnifying the image in focusing.

The feeding mechanism for the film is operated by the shutter through a connecting rod 59, Fig. 4, which is connected by a crank pin 60 with the section 8 of the shutter, and the lower end of this rod has a pin 61 movable in a slot 62 of a guide 63, said pin being rigidly connected with an upwardly extending bar 64 having an offset arm 65 which extends over to the door 45 and terminates in a plate 66 which slides behind vertical guides 67 fastened to the front side of the door 45, there being in the arm 65 a hinge 68 which is vertically below the hinge 48, so that the plate 66 on the extremity of the arm can swing with the arm 45 as it opens and closes. The slide or plate 66 has lugs 69 which enter vertical slots 70 in the guides 67, and passing through apertures in the lugs 69 are pins or teeth 71 which engage in the gear openings 72 of the film, said pins 71 being fastened to a floating bar 73 which moves back and forth toward the film to engage and disengage the pins or teeth with and from the film. The bar 73 has a guide pin 74 which enters a guideway in the slide or plate 66. Below the bar 73 is a lever 76 fulcrumed at 77 on the plate 66, and this lever is connected by a pivot pin 78 with the bar 73, so that as the lever 76 moves back and forth in a horizontal plane the bar 73 will move back and forth with respect to the film. The lever 76 has a bifurcated extremity 79 to span the edge of a cam disk 80 fastened to a shaft 81 which receives motion from the main shaft 1 through a speed multiplying gearing 82 connecting the main shaft with the secondary shaft 84, the latter being connected by bevel gears 85 with the cam shaft 81. By this means the toothed gearing element 73 is moved up and down and back and forth to move the film the length of one picture image section in each cycle of up and down and back and forth movements. It will be noted that the film plate mechanism will always be in coöperative relation with the film, even though the door 45 is moved open, but when the door moves open the bifurcation 79 disengages the cam wheel 80, but as soon as the door closes the engagement is automatically restored.

Extending around the path of the operating crank C is a numbered dial 86 which has a rim 87 provided with spaced notches 88. On the face of the dial are sixteen division marks numbered 1 to 16, which correspond to the number of picture image sections in a foot of film, and the notches 88 are arranged at the odd numbers. On the handle C is a pawl 89 normally retracted by reason of the tension of the spring 90 thereon. When the operator grips the knob 91 of the handle and engages the lug 92 of the pawl, the pawl can be thrown outwardly to the dotted-line position, Fig. 3, to engage in a notch 88, which means that the shutter is in non-exposing position with respect to the film, and when the crank is moved to the next figure, the shutter will have traveled to such a point that the opening thereof will be in line with the film to make an exposure. In other words, the even numbers of the dial represent exposures, and the odd numbers mean non-exposures. When the crank C is in the position shown in Fig. 3, the camera is in condition for permitting focusing or re-focusing, this being done by first pulling on the pull knob D to open the door 45 and move the film to one side, and then operating the lever or handle E to adjust the focusing tube to proper position, as indicated by the dotted lines Fig. 1. The shutter must be moved to bring its opening in line with the lens before the focusing can take place. To facilitate this a stop member 93 is fulcrumed on the crank C at 94 at a point adjacent to the shaft 1. A spring 95 operates on the stop member 93 to keep the free end 96 normally away from the notched rim 87, and on the stop member 93 is a knob 97 which permits the operator to grip the stop member while still holding the knob 91 to draw the stop member into engagement with the rim. While the two knobs are thus held the crank C is moved forwardly until the tooth 96 enters the next notch 88, it being understood that before this engagement takes place the pawl 90 is released. By the stop member 93 engaging the next notch 88 the crank C is arrested at a position opposite an even number, say the number 14, Fig. 3, which corresponds to the open position of the shutter. The camera and door F and the focusing tube door 57 are now opened so that the image can be seen, the proper focusing being accomplished by the lens mechanism in the usual manner. After the focus is obtained the parts are restored to normal position so that the film can be exposed by operating the main crank, the stop member 93 being previously released.

Associated with the operating crank C is an indicating needle 98 which is driven at a reduced speed through a train of speed-reducing gears 99, as shown in Fig. 2, so that the indicating needle 98 will make one complete revolution with one foot of travel of the film, and this indicating needle in connection with a counter or meter 100, Fig. 3, will enable double exposure and dissolving work to be easily and accurately accomplished.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. A moving picture camera comprising a casing, a lens, a shutter composed of relatively rotatable sections, a shaft connected with each section, a differential gearing normally operating the shafts at the same rate of speed, whereby the opening of the shutter is maintained constant, and adapted to be controlled to operate the shafts at relatively different speeds to vary the size of the opening.

2. A moving picture camera having a shutter made in rotatable sections forming an adjustable opening between them, shutter shafts carrying the shutter sections, a main shaft and a differential gearing connecting the said main shaft with the said shutter shafts to drive one of the shutter shafts at a fixed speed relative to the main shaft and to drive the other shutter shaft at the same speed or at a higher or lower speed than the other shutter shaft to vary the size of the shutter opening.

3. A moving picture camera having a shutter made in sections forming an adjustable opening between them, shutter shafts carrying the said shutter sections, one of the shutter shafts being hollow and the other shutter shaft extending through the hollow shutter shaft, a differential gearing connected with the said shutter shafts, a manually controlled driving shaft connected with the said differential gearing to drive the latter, and manually controlled means connected with the said differential gearing to control the latter whereby the shutter opening in one position of the differential gearing is maintained constant and in another position of the said differential gearing the said shutter shafts are operated at relatively different speeds to vary the size of the opening.

SAMUEL M. LAWHUN.